Oct. 27, 1936.    C. L. WRAY    2,058,752
ATTACHING DEVICE FOR TUBULAR CONDUITS AND THE LIKE
Filed Feb. 26, 1935
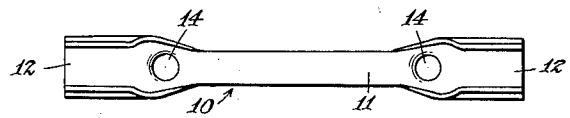
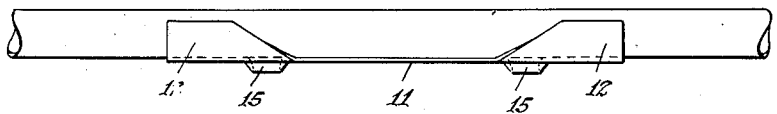
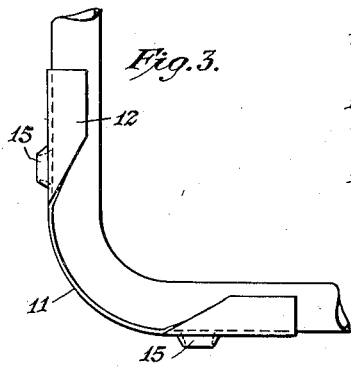
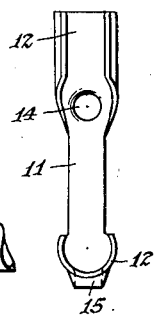
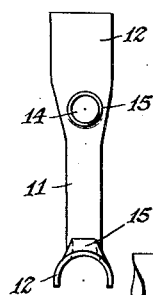
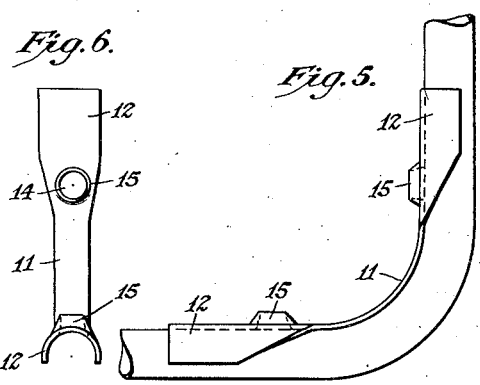
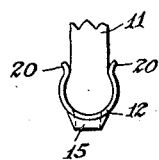
INVENTOR
Cheves L. Wray
BY
Ramsey & Kent
ATTORNEYS Patented Oct. 27, 1936

2,058,752

UNITED STATES PATENT OFFICE 2,058,752

ATTACHING DEVICE FOR TUBULAR CONDUITS AND THE LIKE

Cheves L. Wray, Rahway, N. J.

Application February 26, 1935, Serial No. 8,342

2 Claims. (Cl. 248—65)

This invention relates to clips and more particularly to clips for securing tubes to supporting structures.

Heretofore various devices have been used for retaining tubes, pipes and conduits to supporting structures, but all of these devices have been unsatisfactory either due to their inefficiency in retaining the tubes, pipes and conduits to the supports, or to the difficulty encountered in installation.

An object of the present invention is to provide new, simple and efficient clips for securing tubular members to supporting structures.

Another object of the invention is to provide clips of the above character which are inexpensive to manufacture.

A further object of the invention is to provide clips of such character that they can be used to support tubular members, either on straight runs or on bends of any shape ordinarily required.

A still further object of the invention is to provide clips of such character that tubes can be secured thereto readily but can be disengaged therefrom only with difficulty.

In accordance with the present invention the clips are made of some suitable metal and are of such construction as to have a substantially flat strip-like intermediate portion between flared end portions. These flared end portions are bent into slightly greater than semi-cylindrical form. In order that the clips may be secured to supporting structures, such as walls, etc., they are provided with openings for the passage of attaching means, such as screws, etc. These openings are so positioned and the walls surrounding them are so formed as to serve as reenforcements for the clips when they are secured to a supporting member, but their position is such as not to interfere when the clip is adapted to various configurations of supporting members. With this end in view, the openings are preferably positioned in the flared end portions which are in bent form before described. This position leaves the entire intermediate strip portion unaffected so that this portion can be bent to conform to bends of various types required by the direction of travel of the tubular or cylindrical conduits attached thereto.

Other features, objects and advantages of the invention will become apparent by reference to the following detailed description read in the light of the accompanying drawing, wherein—

Fig. 1 is a plan view of a device embodying the invention.

Fig. 2 is a side elevation of the same device with a tubular member secured thereto.

Fig. 3 is a side elevation of a similar device with a tubular member attached thereto and bent into right-angular form.

Fig. 4 is an end view of the device shown in Fig. 3 with the tubular conduit removed.

Fig. 5 is a view similar to Fig. 3, but with the tube and conduit bent into opposite direction.

Fig. 6 is a view similar to Fig. 4 of the device shown in Fig. 5; and

Fig. 7 is an end view of a slightly modified form of a clip.

Referring now to the drawing, 10 indicates generally a clip embodying the invention, such clip being composed of an intermediate portion 11 in the nature of a flat strip-like part between end portions 12. The end portions 12 are flared out as shown clearly in the drawing, and these entire end portions are bent into slightly greater than semi-cylindrical form. The inside diameter of the end portions is substantially the same as the external diameter of the tube or pipe to be held thereby.

In order that the clips may be readily secured to any supporting structure, openings 14 are provided therein, such openings being punched from the metal of the strip in such fashion as to provide walls for the openings substantially in the shape of truncated cones as shown at 15. These openings are designed, of course, for the passageway of screws, or other attaching members. They are positioned in the flared end portions of the clips a slight distance beyond the ends of the intermediate portions thereof. This position, as will be seen, serves to reenforce the bent end portions, and at the same time the openings do not interfere with bending of the intermediate portions to conform to the shape of the supporting structure.

Since it is desired that the clips possess sufficient strength for the purpose in view, it has been found advantageous to make these clips of cold rolled steel, but it is to be understood that other metals possessing suitable characteristics can be used within the contemplation of the invention.

The operation and use of clips embodying the invention is substantially as follows. A suitable number of clips for the expanse of tube or pipe to be secured to a supporting structure are first secured directly to the supporting structure, such as a wall, a door frame, etc., by means of screws or other devices passing through the openings 14. When the screws are tightened the truncated conical walls 15 of the openings are pressed into the supporting structure to some extent, thereby preventing any creeping or other undesired movement of the clips. If the supporting structure is of such character as to require an external bend, a clip is bent into the form shown in Fig. 5 and secured in place in the same manner. Likewise, if an internal bend is necessary, a clip is bent into the form shown in Fig. 3 and secured in place in the same manner. With the clips in place the tube or pipe may be secured thereto by pressing the tube or pipe between the open edges of the bent end portions of the clips. Pressure of the pipe or tube will serve to momentarily increase the distance between these edges so that the tube or pipe can slip into the cylindrical formation of the end portions of the clips. Once the pipe or tube is in place the end portions spring back to their normal position, and since these end portions are shaped to be in slightly greater than semi-cylindrical form, the pipe or tube will be efficiently held in place thereby. In practice it has been found that a considerable force is required to disengage a tube or pipe from a clip once it has been properly engaged therewith.

If desired the edges of the bent end portions may be extended a slight bit and flared out as shown at 20 in Fig. 7. Such a construction facilitates the separation of these edges when a tube is being attached to a clip, and at the same time scoring of the pipe or tube is considerably lessened or completely eliminated. This type of structure also possesses the feature of permitting the minimum internal distance between the edges of the cylinder at the base of the flare to be considerably smaller than the diameter of the pipe or tube to be held by the clip, thereby increasing the gripping power of the clip.

The invention is capable of use in many types of installations, such as for example, installations of copper tubing used in conjunction with refrigerating apparatus utilizing gas alone as the actuating force; and in many types of installations wherein tubes or pipes follow courses which may be straight or which may assume various bends. While the invention has been described hereinbefore in connection with pipes and tubes, it is to be understood, of course, that the clips are designed for use with any type of conduit, or any other member which has a substantially cylindrical cross section, whether the conduit or member be hollow or solid.

It will be apparent from the foregoing that the present invention provides clips which facilitate installation of members of cylindrical cross-section without sacrifice of efficiency of retention in any fashion. It will also be apparent that departures from the exact embodiments shown in the drawing can be made, in view of which any limitations imposed upon the invention are to be such only as are set forth in the following claims.

I claim:

1. A device for attaching tubular conduits and the like in close proximity to a supporting structure, said device comprising a metallic member having a flat strip-like intermediate portion and having widened end portions, said end portions being bent into slightly greater than semi-cylindrical form for receiving tubular conduits and the like with the conduits separated from the supporting structure only by the thickness of said metallic strip, said strip being of material having suitable resiliency, and said end portions being of such length as to retain said conduits therein against adventitious removal.

2. A device for attaching tubular conduits and the like in close proximity to a supporting structure, said device comprising a metallic member having a flat strip-like intermediate portion and having widened end portions, said end portions being bent into slightly greater than semi-cylindrical form for receiving tubular conduits and the like with the conduits separated from the supporting structure only by the thickness of said metallic strip, said strip being of material having suitable resiliency, and said end portions being of such length as to retain said conduits therein against adventitious removal, said intermediate portion being distortable to conform to the shape of the supporting structure.

CHEVES L. WRAY.